(12) United States Patent
McKnight et al.

(10) Patent No.: US 7,218,338 B2
(45) Date of Patent: May 15, 2007

(54) APPARATUS, METHOD, AND COMPUTER PROGRAM FOR PROVIDING PASS CODES RELATED TO CONFERENCE CALLS

(75) Inventors: David W. McKnight, Garland, TX (US); F. Randall Murray, II, McKinney, TX (US); Stephen R. Whynot, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 10/675,096

(22) Filed: Sep. 30, 2003

(65) Prior Publication Data
US 2005/0069115 A1    Mar. 31, 2005

(51) Int. Cl.
*H04N 7/14* (2006.01)

(52) U.S. Cl. ............... 348/14.09; 348/14.08; 329/93.02; 329/202.01

(58) Field of Classification Search .. 348/14.01–14.09, 348/14.1, 14.11, 14.12, 14.13; 379/202.01, 379/93.02; 370/260, 261; 709/204
See application file for complete search history.

(56) References Cited

U.S. PATENT DOCUMENTS

| | | | |
|---|---|---|---|
| 5,555,290 A * | 9/1996 | McLeod et al. ......... 379/88.25 |
| 5,619,555 A | 4/1997 | Fenton et al. | |
| 5,710,591 A | 1/1998 | Bruno et al. | |
| 5,812,653 A | 9/1998 | Jodoin et al. | |
| 5,889,945 A | 3/1999 | Porter et al. | |
| 6,125,115 A | 9/2000 | Smits | |
| 6,185,565 B1 | 2/2001 | Meubus et al. | |
| 6,192,119 B1 | 2/2001 | Wilson | |
| 6,501,740 B1 * | 12/2002 | Sun et al. ................... 370/261 |
| 7,035,386 B1 * | 4/2006 | Susen et al. ............. 379/93.02 |
| 2001/0002927 A1 | 6/2001 | Detampel, Jr. et al. | |
| 2003/0093700 A1 | 5/2003 | Yoshimoto et al. | |

FOREIGN PATENT DOCUMENTS

WO    WO 03/051027 A1    6/2003

OTHER PUBLICATIONS

Sussen et al. : Method for Checking Access Authorization . . . communications network; Mar. 16, 2000; WO 00/14730.*
Kumar, Korpi, Sengodon: "IP Telephony with H.323, Architectures for Unified Networks and Integrated Services", Apr. 1, 2001, John Wiley & Sons, Inc., US, XP002302183, pp. 134-142 and pp. 290-298.

* cited by examiner

*Primary Examiner*—Melur Ramakrishnaiah

(57) ABSTRACT

A call conferencing apparatus, method, and computer program allow a chairperson or other participant to enter a pass code for a conference call dynamically. Other participants are then prompted for the pass code. Participants who enter the correct pass code are allowed to join a conference bridge, while participants who enter an incorrect pass code are not.

22 Claims, 2 Drawing Sheets

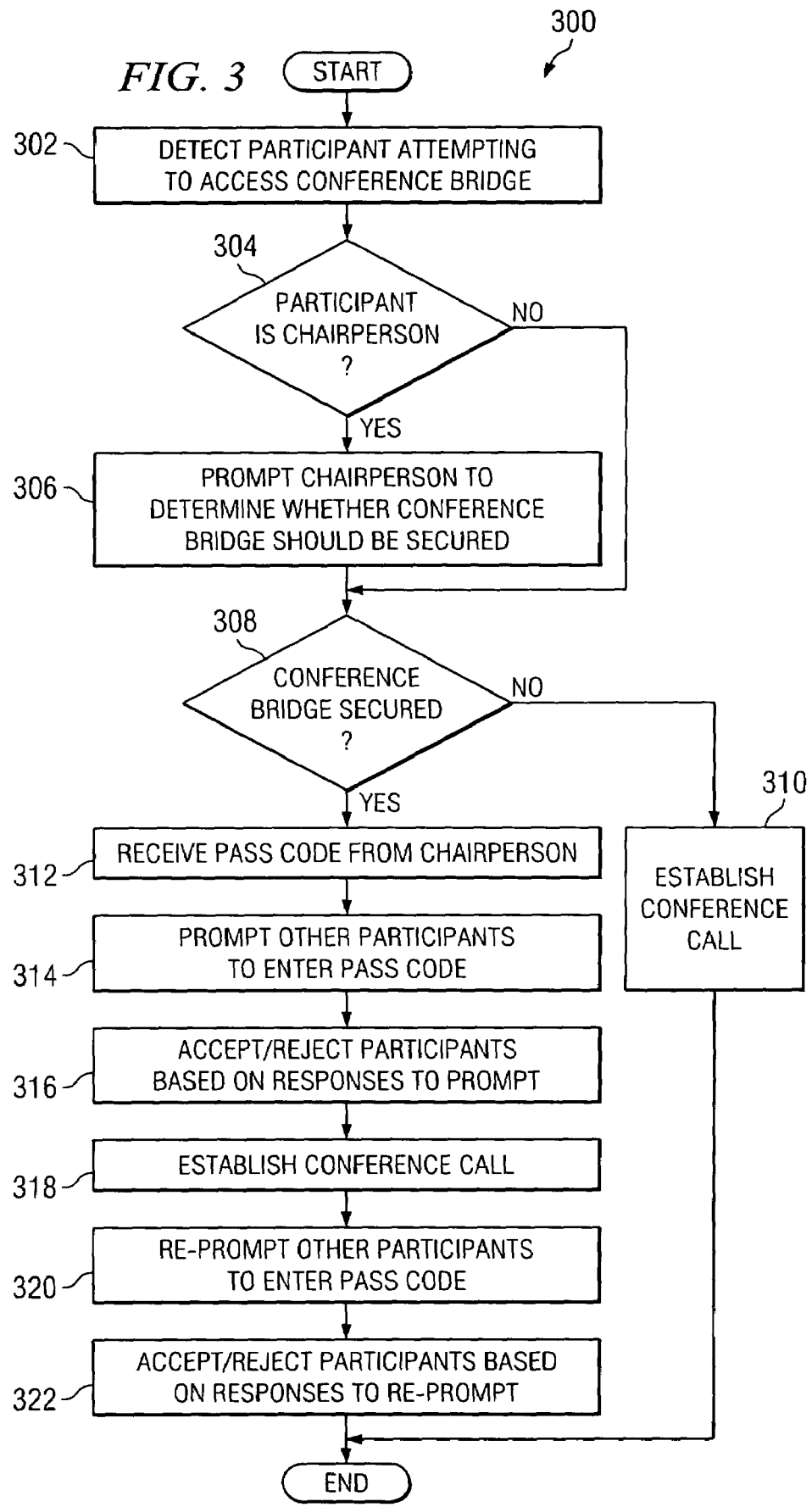

APPARATUS, METHOD, AND COMPUTER PROGRAM FOR PROVIDING PASS CODES RELATED TO CONFERENCE CALLS

CROSS REFERENCE TO RELATED APPLICATIONS

This application is related to U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated herein by reference.

TECHNICAL FIELD

This disclosure relates generally to conferencing systems and more specifically to an apparatus, method, and computer program for providing pass codes related to conference calls.

BACKGROUND

Audio and video conferencing systems are becoming more popular in the United States and around the world. In a conventional conferencing system, one participant communicates audio signals to other participants (often through a multipoint conferencing server or other unit) and receives audio signals from the other participants (indirectly through the server). The participants may also exchange video images allowing the participants to see one another.

SUMMARY

This disclosure provides an apparatus, method, and computer program for providing pass codes related to conference calls.

In one aspect, a call conferencing apparatus, method, and computer program allow a chairperson or other participant to enter a pass code for a conference call dynamically. For example, the pass code may be entered by the chairperson when the chairperson attempts to access a conference bridge. Participants who have already tried to access the conference bridge and participants who later try to access the conference bridge are then prompted to enter the dynamic pass code. Participants who enter the correct pass code are allowed to join the conference bridge, while participants who enter an incorrect pass code are not.

In a particular aspect, the call conferencing apparatus, method, and computer program re-prompt the participants during the conference call, which forces the participants to re-enter the pass code. The pass code could be the same pass code entered at the beginning of the conference call or a new pass code provided by the chairperson or other participant.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example method for providing pass codes related to conference calls according to one embodiment of this disclosure.

DETAILED DESCRIPTION

Figure 1:
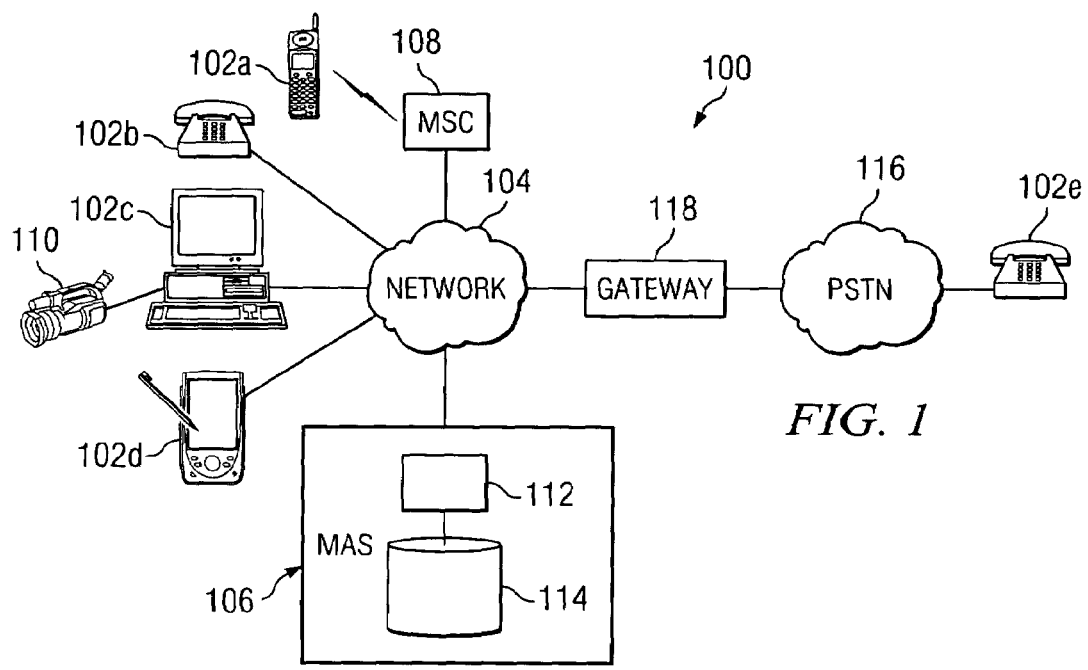
FIG. 1 illustrates an example conferencing system according to one embodiment of this disclosure.

FIG. 1 illustrates an example communication system 100 according to one embodiment of this disclosure. The system 100 shown in FIG. 1 is for illustration only. Other embodiments of the system 100 may be used without departing from the scope of this disclosure.

Pass codes are often used to limit access to conference calls. For example, a participant typically needs to enter a pass code, such as a numeric sequence, before the participant can join a conference call. A problem with conventional conferencing systems is that the pass code is often stored in the system before the conference call begins. This often makes it less convenient and more difficult to change the pass code. As a particular example, a leader of a conference call (often called a "chairperson") typically needs to physically enter several other codes indicating that the chairperson is allowed to change the pass code before the pass code is actually changed. Also, conventional conferencing systems typically lack any mechanism for re-verifying whether a participant who previously entered a pass code is allowed to participate in a conference call.

In the illustrated example, the system 100 includes one or more communication devices 102*a*–102*d*, a network 104, and a media application server ("MAS") 106.

The communication devices 102*a*–102*d* represent devices used by users or subscribers during communication sessions. Communication sessions represent data conversions or conversations between devices or applications over a network. For example, each communication device 102*a*–102*d* represents an input/output device that could include a microphone and a speaker to capture and play audio information. A communication device 102*a*–102*d* could also include a camera and a display to capture and present video information. A communication device 102*a*–102*d* could further represent a portable computing device for sending and receiving text or other messages.

During a communication session, one or more of the devices 102 communicate with the MAS 106 over the network 104. As an example, a communication device 102 may transmit audio information to the MAS 106 and receive audio information from the MAS 106. Each communication device 102 may be constructed or configured from any suitable hardware, software, firmware, or combination thereof for transmitting or receiving audio, video, or other information.

The system 100 shown in FIG. 1 illustrates various embodiments of the communication devices 102. For example, the communication device 102*a* represents a wireless mobile station that communicates with the network 104 through a mobile switching center ("MSC") 108. The communication device 102*b* represents a wired Internet Protocol ("IP") telephone that communicates directly with the network 104. An example of a suitable device is an i2004 Internet Telephone, commercially available from Nortel Networks of Brampton, Ontario, Canada. The communication device 102*c* represents a personal computer, such as a desktop computer or a laptop computer. The communication device 102*d* represents a wireless device, such as a Blackberry or personal digital assistant. One or more of these devices 102*a*–102*d* may include video functionality, such as when the communication device 102a includes a video camera or when the communication device 102c is coupled to a web camera 110.

While this represents several embodiments of the communication devices 102, other or additional communication devices 102 may be utilized in the system 100 of FIG. 1. By way of illustration in FIG. 1, each of the communication devices 102a–102d is different. It will be understood, however, that the communication devices 102 in the system 100 may include or represent the same or similar type of device or other combination of communication devices.

The network 104 is coupled to the communication devices 102, the MAS 106, and the mobile switching center 108. In this document, the term "couple" refers to any direct or indirect communication between two or more components, whether or not those components are in physical contact with each other. The network 104 facilitates communication between components of the system 100. For example, the network 104 may communicate Internet Packets ("IP"), frame relay frames, Asynchronous Transfer Mode ("ATM") cells, Ethernet, X.25, frame relay, or other suitable information protocols between network addresses or devices. The network 104 may include one or more local area networks ("LANs"), metropolitan area networks ("MANs"), wide area networks ("WANs"), all or portions of a global network such as the Internet, or any other communication system or systems at one or more locations.

The media application server ("MAS") 106 is coupled to the network 104. The MAS 106 supports communication sessions between communication devices 102 in the system 100. For example, the MAS 106 may receive from one or multiple communication devices 102 requests to establish or join a conference call. The MAS 106 may also transmit/receive audio or video information to/from each communication device 102 involved in the conference call.

Figure 2:
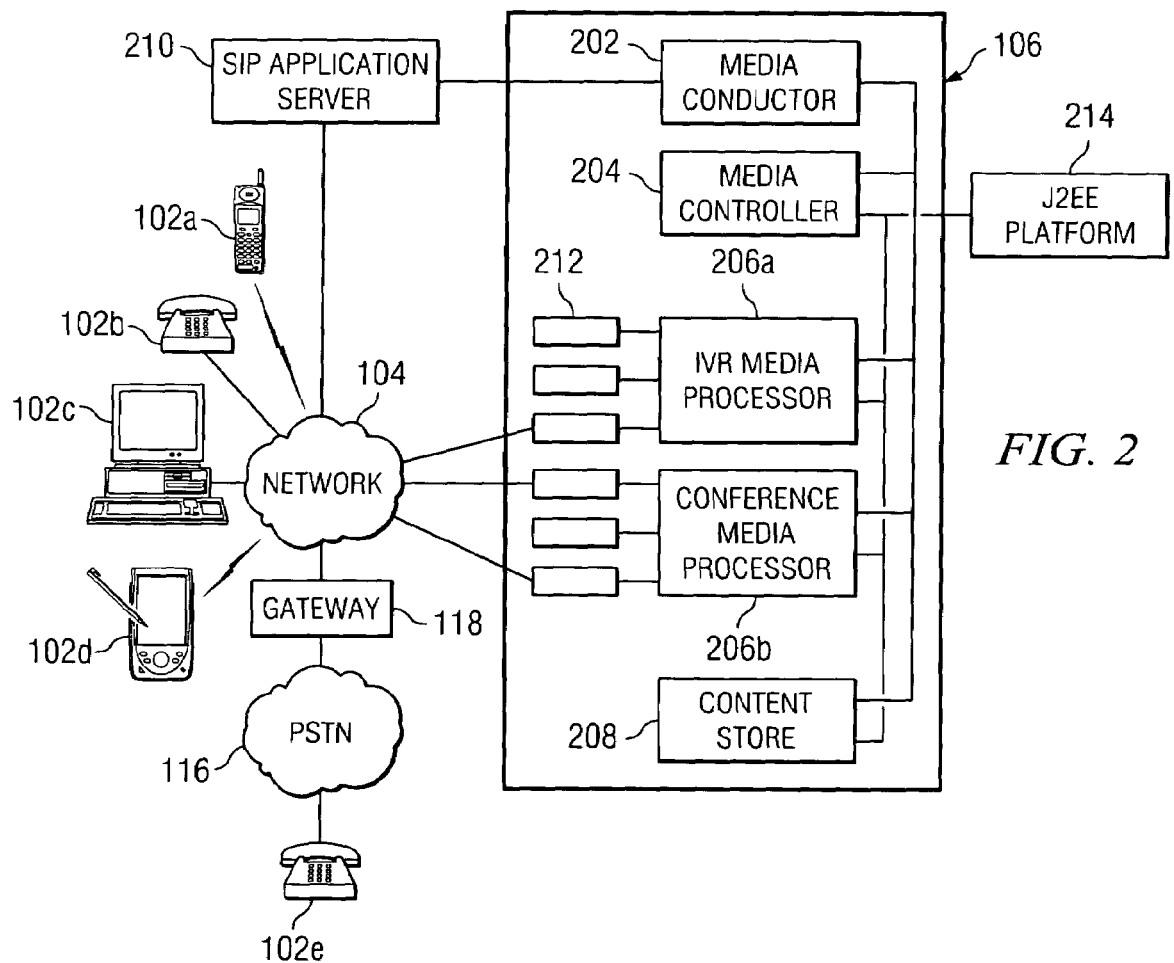
FIG. 2 illustrates an example media application server according to one embodiment of this disclosure.

The MAS 106 may be constructed or configured using any hardware, software, firmware, or combination thereof for supporting communication sessions in the system 100. As an example, the MAS 106 could include one or more processors 112 that execute instructions and one or more memories 114 that store instructions and data used by the processors 112. The processor(s) 112 is generally understood to be a device that drives a general-purpose computer. It is noted, however, that other processor devices such as microcontrollers, Field Programmable Gate Arrays (FPGAs), or Application Specific Integrated Circuits (ASICs) can be used as well and achieve the benefits and advantages described herein. An example MAS 106 is shown in FIG. 2, which is described below and in co-pending U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated by reference herein.

Communication session(s) established and managed by the MAS 106 can include additional communication devices other than the communication devices 102a–102d. For example, a communication device 102e is shown coupled to the network 104 through a public telephone network, such as a public switched telephone network ("PSTN") 116. The communication device 102e may include a conventional analog or digital telephone or some other type of communication device. In embodiments where the PSTN 116 and the network 104 use different or incompatible protocols to communicate, a gateway 118 may be used that is coupled to the network 104 and the PSTN 116 to facilitate communication between the networks. The gateway 118 functions to translate between the different protocols used by the network 104 and the PSTN 116. Although one PSTN 116 is shown in FIG. 1 coupled to the network 104, other or additional types of public or private networks may be coupled to the network 104.

The communication devices 102 and the MAS 106 could support suitable standards or protocols used to set up, maintain, and terminate communication sessions between end users. As examples, the communication devices 102 and the MAS 106 could communicate audio, video, or other information using the Realtime Transfer Protocol ("RTP") over User Datagram Protocol ("UDP"), the International Telecommunication Union—Telecommunications ("ITU-T") H.263 standard (video CODEC), the G.711 and G.729 audio CODEC standards, and other or additional standards or protocols. Other CODECs, such as Moving Picture Experts Group-4 ("MPEG–4"), Digital Video Express ("DIVX"), and Windows Media Video ("WMV"), can be supported by the MAS 106. In addition, signaling messages sent between the communication devices 102 and the MAS 106 may include or conform with the Session Initiation Protocol ("SIP"), which is an application layer protocol for the establishment, modification, and termination of conferencing and telephony sessions over IP-based networks. As will be appreciated, other or additional protocols and configurations may be used.

In one aspect of operation, the MAS 106 includes one or more processes, such as software applications providing an activity, a function, or a systematic sequence of operations that produces a specified result, for handling conference calls. In this document, the phrase "conference call" refers to a communication session involving more than two participants. Also, the term "participant" refers to a person who joins a conference call, whether or not the person actually participates in the conference call (such as by speaking). A participant could represent a person who joins a conference call for the entirety of the call or for just a portion of the conference call. For a conference call, the MAS 106 supports a conference bridge that allows multiple participants to dial or otherwise contact the bridge and join a conference call. A "conference bridge" represents a facility or service that allows participants to be connected together for a conference call.

A conference call is typically associated with at least one "chairperson." A chairperson is generally a person (and who could be a participant) responsible for managing the conference call. As a particular example, the chairperson could represent a participant who scheduled the conference call, opens the conference bridge, and who will moderate discussions during at least part of the conference call. The chairperson could also represent some other person associated with setting up the conference call.

When the chairperson of a conference call accesses a conference bridge, the MAS 106 prompts the chairperson to enter a pass code. The chairperson then provides any suitable pass code that the chairperson selects. The pass code represents any suitable code for controlling access to a conference call. The pass code provided by the chairperson represents the pass code to be used to limit access to the conference call bridge by other participants. The pass code could, for example, represent a sequence of numbers or characters that can be entered using a keypad of a communication device 102.

Once the chairperson provides the MAS 106 with a pass code, any other participants who have or will attempt to access the conference bridge are prompted for the pass code entered by the chairperson. Participants who enter the proper pass code are allowed to access the bridge and thereby join the conference call. Participants who enter an incorrect pass code are re-prompted or rejected. As a particular example, before a conference call begins, the chairperson could inform the other participants that the pass code equals the starting date plus five and the starting time plus three. The chairperson could inform the other participants of the pass code or the way to calculate the pass code through, for example, electronic mail messages, telephone calls, or in person. Using this convention, if the conference call is scheduled for the 25 of August at 10:00 am, the chairperson and other participants would provide a pass code of 3013 (25+5 and 10+3). Any other or additional conventions could be used for establishing pass codes.

In particular embodiments, the MAS 106 allows a chairperson or other participant to indicate whether a pass code is needed to access a conference bridge. The chairperson could provide this indication before opening the conference call bridge. If no pass code is needed, any participant who attempts to access the conference bridge will join the conference call.

In another aspect of operation, after a conference call begins, the MAS 106 re-prompts the participants who have joined the conference call. This re-prompting forces the participants to enter the pass code again. The pass code entered during the re-prompting could be the same pass code used at the beginning of the conference call, a new pass code selected by the conference call chairperson or other participant during the conference call, or any other pass code. In particular embodiments, the re-prompting is done automatically at predetermined intervals, in response to a request for re-prompting by the chairperson, or based on any other suitable criteria.

In this way, the pass codes for conference calls need not be stored in the system 100 before the conference call begins or after the conference call ends. This reduces or eliminates the need to securely and reliably store pass codes in a database or other component of the system 100. Also, the pass codes can be altered by the chairperson or other participant before or during the conference call. This increases the ease of altering a pass code. In addition, by re-prompting participants to enter a pass code during a conference call, the system 100 increases the security of a conference call.

Although FIG. 1 illustrates one example of a communication system 100, various changes may be made to FIG. 1. For example, varying communication devices 102, networks 104, and servers 106 could be used in the system 100. Also, the functionality of MAS 106, described above as being implemented on a server, could be implemented on any other computing device, such as a desktop computer or a laptop computer. In addition, FIG. 1 illustrates one operational environment in which the various features of the MAS 106 may be used. These features could be implemented in any other suitable operating environment.

FIG. 2 illustrates an example media application server 106 according to one embodiment of this disclosure. The MAS 106 illustrated in FIG. 2 is for illustration only. Other embodiments of the MAS 106 could be used without departing from the scope of this disclosure. Also, while FIG. 2 illustrates the MAS 106 operating in the system 100 of FIG. 1, the MAS 106 may operate in other suitable systems.

In the illustrated example, the MAS 106 includes a media conductor 202, a media controller 204, two media processors ("MPs") 206a–206b, and a content store 208.

The media conductor 202 processes signaling messages received by the MAS 106. In some embodiments, the communication devices 102 communicate the signaling messages directly (or via a gateway, which serves as an entrance/exit into a communications network) to the MAS 106. In other embodiments, the communication devices 102 communicate signaling messages indirectly to the MAS 106, such as when a Session Initiation Protocol ("SIP") application server 210 (that received a request from a communication device 102) sends the signaling messages to the media conductor 202 on behalf of the communication device 102. The communication devices 102 may communicate directly with the SIP application server 210 or indirectly through a gateway, such as gateway 118. The media conductor 202 processes the signaling messages and communicates the processed messages to the media controller 204. As particular examples, the media conductor 202 may implement SIP call control, parameter encoding, and media event package functionality.

The media controller 204 manages the operation of the MAS 106 to provide services to the communication devices 102. For example, the media controller 204 may receive processed SIP requests from the media conductor 202, where the requests involve conference or other calls. The controller 204 may then select the media processor 206 to handle each of the calls, support audio/video capability negotiations, enforce licenses controlling how the MAS 106 can be used, and control negotiations based on the licenses. The negotiations could include identifying the CODEC or CODECs to be used to encode and decode audio or video information during a call.

The media processors 206a–206b handle the exchange of audio or video information between communication devices 102 involved in a conference or other call. For example, a media processor 206 could receive audio and video information from one communication device 102 involved in a call, process the information as needed, and forward the information to at least one other communication device 102 involved in the call. The audio and video information may be received through one or more ports 212, which couple the media processors 206 to the network 104. The ports 212 may represent any suitable structure operable to facilitate communication between the MAS 106 and the network 104. In some embodiments, each of the media processors 206 represents a software application for specific media processing, such as interactive voice response ("IVR") media or conference media, which is executed on the MAS 106 hardware platform via the operating system.

In this example embodiment, each media processor 206 provides different functionality in the MAS 106. For example, in some embodiments, the media processor 206a provides IVR functionality in the MAS 106. As particular examples, the media processor 206a supports a voice mail function that can record and play messages or an auto-attendant function that provides a menu and directs callers to particular destinations based on their selections. The media processor 206b provides conferencing functionality in the MAS 106, such as by facilitating the exchange of audio and video information between communication devices 102.

The content store 208 provides access to content used by the various components of the system 100. For example, in some embodiments, the content store 208 provides access to stored voice mail messages and access codes used to initiate or join conference calls. The content store 208 also provides access to any other or additional information. In other embodiments, the content store 208 is replaced by a conventional database or other data storage facility.

A Java 2 Enterprise Edition ("J2EE") platform 214 is coupled to the MAS 106. The J2EE platform 214 allows the MAS 106 to retrieve information used to provide subscriber services in the system 100. For example, the J2EE platform 214 may provide audio announcements used by the IVR media processor 206a. The J2EE platform 214 represents one possible apparatus used to provide audio or other information to the MAS 106. Any other or additional device or apparatus may be used to provide the information to the MAS 106.

In a particular embodiment, various components of the MAS 106 represent software processes executed by the processor 112 of the MAS 106. While the components 202–208 have been described as being executed by a MAS 106, the software processes could be executed by other computing devices such as a desktop computer. In other embodiments, the various components of the MAS 106 may be implemented in other ways, such as in hardware.

In the illustrated example, the conference media processor 206b implements the conferencing functionality described above. For example, the media conductor 202 receives signaling messages indicating that two or more communication devices 102 wish to engage in a conference call. The controller 204 receives the requests and causes the conference media processor 206b to establish the conference call. The conference media processor 206b then receives audio or video information from each communication device 102 and forwards the information to the other communication devices 102.

Preparing for a conference call, the media controller 204 authenticates participants who want to join a conference call. The media controller 204 also identifies when a chairperson for the conference call is authenticated and prompts the chairperson to secure the conference bridge with a pass code. If the chairperson wishes to secure the conference bridge, the chairperson enters a pass code. Other participants who wish to access the conference bridge are then prompted for the pass code. If a participant enters the correct pass code, the media controller 204 allows the participant to join the conference call handled by the media processor 206b. If a participant enters an incorrect pass code, the media controller 204 prevents the participant from joining the conference call.

Although FIG. 2 illustrates one example of a media application server 106, various changes may be made to FIG. 2. For example, any number of media processors 206 could be used in the MAS 106. Also, the functional divisions shown in FIG. 2 are for illustration only. Various components can be combined or omitted or additional components can be added according to particular functional designations or needs. In addition, while the components 202–208 have been described as being executed by a server, the components 202–208 may be executed by other hardware platforms, such as a desktop computer or a laptop computer.

FIG. 3 illustrates an example method 300 for providing pass codes related to conference calls according to one embodiment of this disclosure. For ease of explanation, the method 300 is described with respect to the MAS 106 of FIG. 2 operating in the system 100 of FIG. 1. The method 300 may also be used by other suitable devices or in any other suitable system.

The MAS 106 detects a participant attempting to access a conference bridge at step 302. This may include, for example, the media conductor 202 receiving one or more signaling messages, such as SIP messages, from a communication device 102. This may also include the media controller 204 determining that the signaling messages indicate a conference call is desired.

The MAS 106 determines whether the participant accessing the conference bridge is the chairperson of a conference call at step 304. This may include, for example, the media controller 204 authenticating the participant and/or determining whether, based on registration information provided by the participant's communication device 102, the participant is the chairperson of the conference call. The chairperson may be identified based on any suitable criteria. For example, the participant may enter a code identifying the participant as the chairperson. A participant could also be identified ahead of time as the chairperson of a conference call.

If the participant is the chairperson, the MAS 106 requests that the chairperson indicate whether the conference bridge should be secured at step 306. This may include, for example, the media controller 204 providing the chairperson with an option of securing the conference bridge by providing a particular response, such as pressing a particular keypad button on the chairperson's communication device 102, speaking a particular response, or in any other suitable manner.

The MAS 106 determines whether to secure the conference bridge at step 308. This may include, for example, the media controller 204 determining whether the chairperson selected the option of securing the conference bridge by pressing the particular keypad button.

If the conference bridge is not to be secured, the MAS 106 establishes a conference call at step 310. This may include, for example, the MAS 106 establishing bearer connections with the chairperson and any other participant who wishes to join the conference call. This may also include the MAS 106 allowing the participants to exchange audio or video information.

If the conference bridge is to be secured, the MAS 106 receives a pass code from the chairperson at step 312. This may include, for example, the chairperson entering a numeric or character sequence using the keypad of the chairperson's communication device 102 and the media controller 204 receiving the pass code from the chairperson. The chairperson could also speak the pass code or provide the pass code in any other manner. This may also include the chairperson opening up the conference bridge to other participants.

The MAS 106 requests that other participants who wish to access the conference bridge provide the pass code at step 314. For example, the media controller 204 may prompt a participant to enter the pass code by speaking the pass code or using a keypad on the participant's communication device 102. The MAS 106 accepts or rejects each participant based on that participant's response to the prompt at step 316. If a participant entered the correct pass code, the media controller 204 allows the participant to access a conference bridge handled by the media processor 206b. The MAS 106 then establishes the conference call at step 318, where the MAS 106 establishes bearer connections (conference call) with the other participants who wish to join the conference call and who provided the correct pass code.

After a period of time has passed during the conference call, the MAS 106 re-prompts the participants to enter a pass code again at step 320. This may include, for example, the media controller 204 requesting that the participants speak the pass code or use keypads on the participants' communication devices 102. This may also include the media controller 204 using the pass code previously provided by the chairperson or receiving a new pass code from the chairperson. This may further include the MAS 106 allowing a participant who entered an incorrect pass code to re-enter the pass code again.

The MAS 106 accepts or rejects each participant based on that participant's response to the re-prompt at step 322. This may include, for example, the media controller 204 allowing a participant to continue participating in the conference call if the participant entered the correct pass code. This may also include the media controller 204 terminating a connection with a participant who entered an incorrect pass code one or multiple times.

Although FIG. 3 illustrates one example of a method 300 for providing pass codes related to conference calls, various changes may be made to FIG. 3. For example, FIG. 3 illustrates the MAS 106 allowing the chairperson to provide the pass code(s). In other embodiments, other participant(s) or person(s) could provide the pass code(s). Also, FIG. 3 shows that if the conference call is not secured at the beginning of the conference call, the call is not secured during the entire call. In other embodiments, an unsecured conference call could become a secured conference call. As an example, once the unsecured conference call is established at step 310, the MAS 106 could prompt participants to enter a pass code and secure the call at steps 320, 322. Further, FIG. 3 shows that participants are re-prompted for the pass code during the conference call. However, this is optional and need not be performed. In addition, the MAS 106 may use any suitable mechanism to receive input from participants, such as speech recognition, DTMF detection, or other mechanisms.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for call conferencing, comprising:
   detecting a first access to a conference bridge operable to support a conference call;
   receiving a first pass code from the first access;
   securing the conference bridge using the first pass code received from the first access and allowing a second access to the conference bridge in response to receiving the first pass code from the second access; and
   allowing the second access to continue after the conference call begins based at least partially on receiving a second pass code from the second access after the conference call has begun, wherein the second pass code may or may not equal the first pass code.

2. The method of claim 1, wherein the second pass code does not equal the first pass code.

3. The method of claim 2, further comprising receiving the second pass code from the first access during the conference call.

4. The method of claim 1, wherein receiving the first pass code comprises:
   prompting a participant to identify whether the conference bridge is to be secured; and
   receiving the first pass code in response to the participant indicating that the conference bridge is to be secured.

5. The method of claim 4, wherein the second access is based at least partially on the first pass code from the first access when the conference bridge is secured.

6. The method of claim 1, further comprising identifying the first access as being associated with a chairperson of the conference call; and
   wherein receiving the first pass code comprises receiving the first pass code from the first access in response to determining that the first access is associated with the chairperson.

7. The method of claim 1, wherein allowing the second access to the conference bridge comprises:
   prompting a participant for the first pass code;
   receiving an identification of one or more depressed numeric buttons on a communication device associated with the participant; and
   determining whether the one or more identified numeric buttons represents a numeric sequence associated with the first pass code.

8. The method of claim 1 further comprising:
   receiving the second pass code from the first access during the conference call, the second pass code different from the first access code; and
   prompting the second access for the second pass code after the conference call begins and allowing the second access to continue upon receipt of a pass code from the second access that is equal to the second pass code.

9. An apparatus for call conferencing, comprising:
   one or more ports operable to receive at least one channel of a plurality of channels for a conference call; and
   one or more processors collectively operable to:
   detect a first access to a conference bridge operable to support the conference call;
   receive a first pass code from the first access;
   secure the conference bridge using the first pass code received from the first access and allow a second access to the conference bridge in response to receiving the first pass code from the second access; and
   allow the second access to continue after the conference call begins based at least partially on receiving a second pass code from the second access after the conference call has begun, wherein the second pass code may or may not equal the first pass code.

10. The apparatus of claim 9, wherein the second pass code does not equal the first pass code.

11. The apparatus of claim 10, wherein the one or more processors are further collectively operable to receive the second pass code from the first access during the conference call.

12. The apparatus of claim 9, wherein the one or more processors are collectively operable to receive the first pass code by:
   prompting a participant to identify whether the conference bridge is to be secured; and
   receiving the first pass code in response to the participant indicating that the conference bridge is to be secured.

13. The apparatus of claim 12, wherein the second access is based at least partially on the first pass code from the first access when the conference bridge is secured.

14. The apparatus of claim 9, wherein the one or more processors are further collectively operable to authenticate the first and second accesses.

15. The apparatus of claim 9, wherein the first pass code comprises a numeric code.

16. A computer program embodied on a computer readable medium and operable to be executed by a processor, the computer program comprising computer readable program code for:

detecting a first access to a conference bridge operable to support a conference call;

receiving a first pass code from the first access;

securing the conference bridge using the first pass code received from the first access and allowing a second access to the conference bridge in response to receiving the first pass code from the second access; and allowing the second access to continue after the conference call begins based at least partially on receiving a second pass code from the second access after the conference call has begun, wherein the second pass code may or may not equal the first pass code.

17. The computer program of claim 16, wherein the second pass code does not equal the first pass code.

18. The computer program of claim 17, further comprising computer readable program code for receiving the second pass code from the first access during the conference call.

19. The computer program of claim 16, wherein the computer readable program code for receiving the first pass code comprises computer readable program code for:

prompting a participant to identify whether the conference bridge is to be secured; and receiving the first pass code in response to the participant indicating that the conference bridge is to be secured.

20. The computer program of claim 19, wherein the second access is based at least partially on the first pass code from the first access when the conference bridge is secured.

21. The computer program of claim 16, further comprising computer readable program code for identifying the first access as being associated with a chairperson of the conference call.

22. The computer program of claim 16, wherein the computer readable program code for allowing the second access to the conference bridge comprises computer readable program code for:

prompting a participant for the first pass code;

receiving an identification of one or more depressed numeric buttons on a communication device associated with the participant; and determining whether the one or more identified numeric buttons represents a numeric sequence associated with the first pass code.

* * * * *